May 7, 1957          A. N. WATSON          2,791,452
WEDGE TYPE OF COMPRESSION TUBE COUPLING
Filed April 16, 1952          2 Sheets-Sheet 1
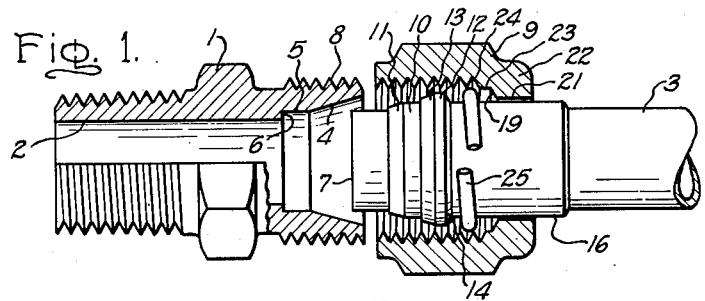
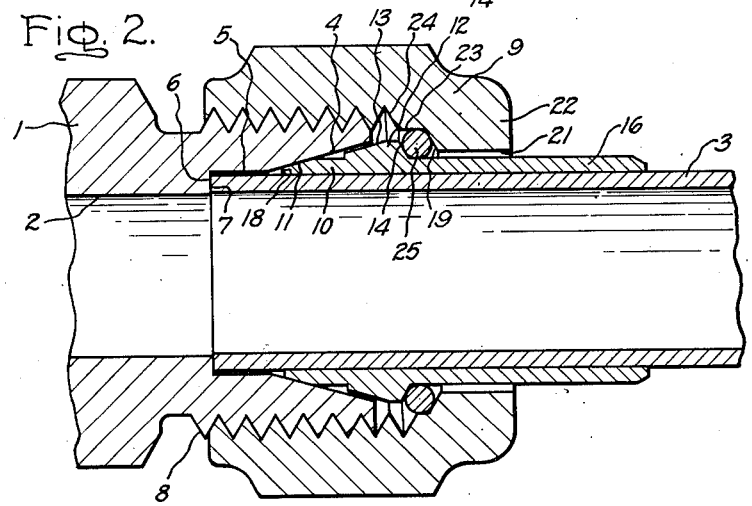
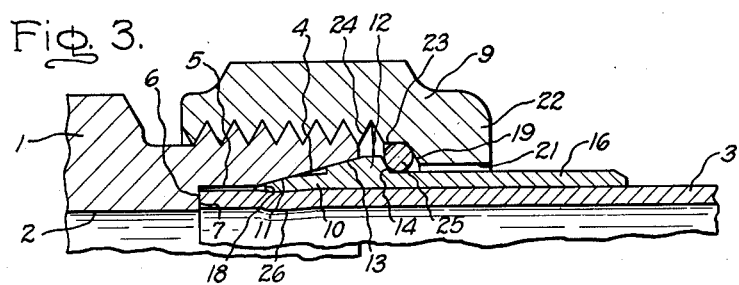
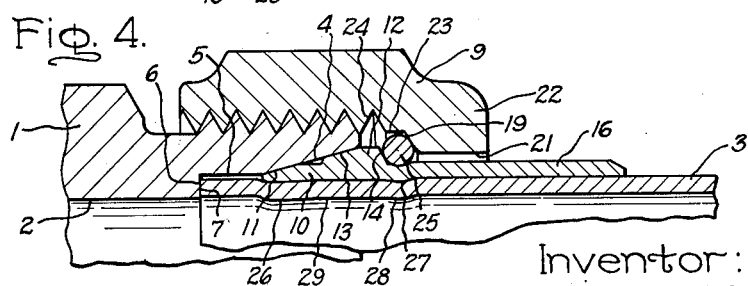
Inventor:
Alexander N. Watson,
by James J. Lazna
His Attorney.

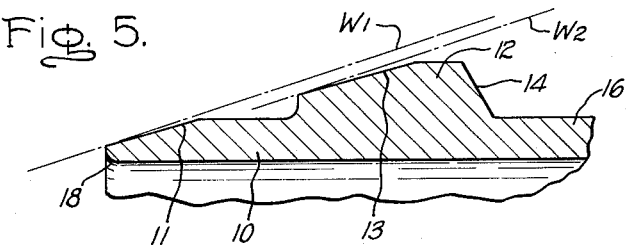
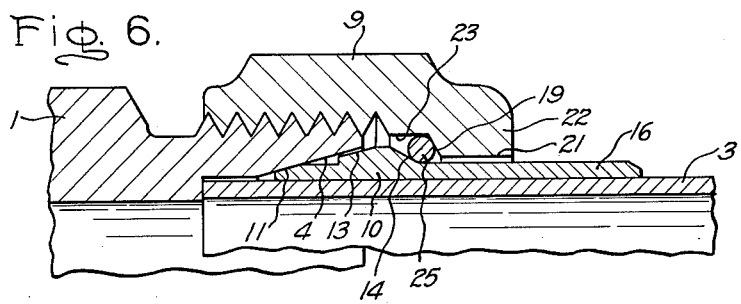
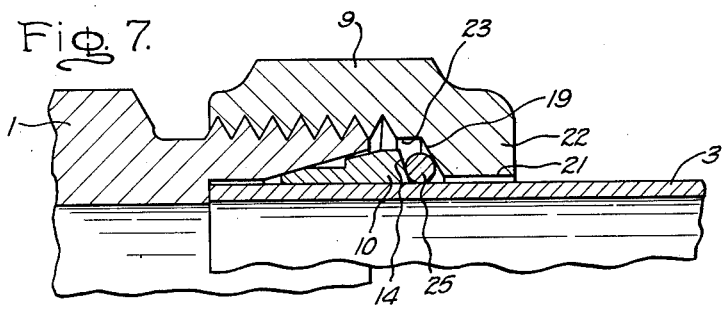
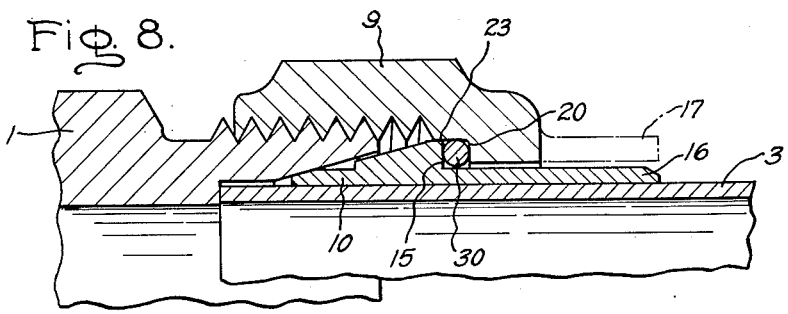
Inventor:
Alexander N. Watson,
by *James J. Lazna*
His Attorney.

United States Patent Office 2,791,452
Patented May 7, 1957

2,791,452

WEDGE TYPE OF COMPRESSION TUBE COUPLING

Alexander N. Watson, East Cleveland, Ohio, assignor to Foremost Fittings Company, Cleveland, Ohio Application April 16, 1952, Serial No. 282,560

2 Claims. (Cl. 285—342)

My invention relates in general to tube or pipe couplings, and more particularly to a tube coupling of the compression type wherein the connection is made to a straight-ended tube without the need of preliminarily flaring the tube end.

The increasingly severe operating requirements which are constantly being demanded of tube or pipe couplings have created a dire need at present for a coupling which not only will withstand extremely high internal fluid pressure while remaining fluid tight, but which also will not loosen or fail either by temperature variations or under rapidly pulsating or intermittent fluid pressures within the coupling, or under the severe vibration to which it may be subjected for long continuous periods of time in certain applications, as in the case of a coupling used on the fuel, oil or air lines of supersonic speed aircraft for instance. So far as known, the couplings presently available and in general use do not meet all of the above mentioned requirements. Thus, when tube couplings of the well-known flared tube-end type are subjected to such severe operating conditions, they develop fatigue cracks in the flared edge of the tube which then gradually lengthen and work back along the tube until they eventually cause leakage and resultant failure of the coupling. Likewise, couplings of the well-known compression type such as shown in U. S. Patent No. 2,139,413 to H. Kreidel, for example, and employing an inner packing ring or sleeve having an undercut sharp edge which is contracted into biting and gripping engagement with the outer surface of the tube, do not stand up when subjected to such severe vibration for extended periods for the reason that the sharp biting edge of the ring localizes the compressive stresses in the coupling at a highly concentrated circumferential region of the tube with the result that fatigue develops in the metal of the tube at the said region such as eventually causes the tube to become severed or sheared at such region and the coupling to fail. Moreover, the production of such undercut inner packing rings is a difficult manufacturing operation to perform on automatic high-production machinery which results in a high percentage of production rejects with attendant high manufacturing cost.

It is an object, therefore, of my invention to provide a tube or pipe coupling which will effectively fulfill all of the above mentioned service requirements.

Another object of my invention is to provide a tube coupling which is of relatively simple and inexpensive construction yet will withstand the most severe of present day service requirements while remaining fluid-tight.

Still another object of my invention is to provide a tube coupling of the compression type having rotatively interconnected coupling members which will remain positively locked in place against unscrewing and resultant loosening of the coupling under any and all operating conditions to which it may be subjected in use.

A further object of my invention is to provide a tube coupling of the compression type which will remain fluid-tight under the severest of present day operating conditions and which is comparatively easy and inexpensive to manufacture on high-speed automatic machinery.

According to one aspect of the invention, the inner packing ring or compression sleeve of a compression type tube coupling is formed, at spaced points along its length, with forwardly facing circumferential wedge surfaces so arranged relative to each other as to successively engage and wedge against an outwardly flaring frusto-conical wedge surface in the tube-receiving bore of the coupling body upon tightening of the coupling, whereby to contract the sleeve against the tube to neck the latter and form a fluid-tight seal therebetween and, in addition, limit the inward movement of the sleeve into the bore of the coupling body to a predetermined degree so as to prevent undue contraction of the sleeve and corresponding excessive neck-in of the tube. According to a further aspect of the invention, in such compression type couplings having screw-thread interconnected coupling members, a lock ring or washer is interposed between the coupling nut member and an external wedge collar on the packing sleeve of the tube coupling for the purpose of transmitting the closing force of the coupling nut member to the sleeve and locking the said parts against relative rotation such as would result in unscrewing and loosening of the coupling. According to a preferred form of the invention, a contractible type lock ring or washer is employed which fits snugly over the packing sleeve and contracts or necks it at the region of the ring through the action of the forces applied to the ring and the sleeve during the tightening of the coupling, the said contraction of the sleeve thus serving to secondarily neck-in the tube at such region to thereby provide a further or secondary grip thereon and an additional fluid-tight seal therewith.

Further objects and advantages of my invention will appear from the following detailed description of species thereof and from the accompanying drawings in which:

Fig. 1 is a view partly in elevation and partly in longitudinal section of a separated tube coupling comprising my invention, with the coupling members thereof shown in position ready for assembly; Fig. 2 is a longitudinal section of the coupling on an enlarged scale, with the coupling members shown in partially assembled position immediately prior to the start of compressive tightening thereof; Fig. 3 is a fragmentary longitudinal section of the coupling at an intermediate stage in the compressive tightening thereof; Fig. 4 is a fragmentary longitudinal section of the completely assembled coupling at the end of tightening thereof; Fig. 5 is a fragmentary longitudinal section, on a greatly enlarged scale, of the packing ring or sleeve member of the coupling; Fig. 6 is a fragmentary longitudinal section of a modified form of tube coupling according to the invention, and Figs. 7 and 8 are fragmentary longitudinal sections of two further modifications of the invention.

Referring to the drawings, the tube or pipe coupling according to the invention comprises a body member or male connector 1 of generally tubular shape, which may be a part of a machine or apparatus, or may be the body of a union or other pipe fitting. The tubular body member 1 is provided with a bore or passageway 2 for receiving the tube or pipe 3 to be coupled. The said passageway 2 is formed with a slightly outward flaring frusto-conical mouth or outer end portion 4 leading inward to a relatively short counterbore portion 5 terminating in a shoulder 6 forming an abutment or stop for the end face 7 of the tube 3. The tube or pipe 3 to be coupled to the body member 1 is of substantially the same internal bore as the body member and is inserted in the counterbore 5 with its end face 7 in abutment with the shoulder 6. The angle of inclination of the flaring mouth portion 4 of the passageway 2 may range from around 20° or so down to 7° or thereabouts, Because of the outwardly flaring form of the interior wall of the tubular body member 1, the wall thickness thereof gradually decreases toward the outer end of such member, the wall of the body member tapering down, in accordance with the invention, to a relatively narrow thickness (less than about 1/16 inch) at its outer end so as to be thin enough to be expansible to a limited degree of at least a few thousandths of an inch or so. The tubular body member 1 is externally threaded, as indicated at 8, for screwing together with an internally threaded cap nut 9 which acts as the pressure member or female connector of the coupling.

Closely surrounding the tube 3 so as to have a snug sliding fit therewith, and adapted to be forced against the flaring mouth 4 of the body member 1 by the pressure nut 9 to wedge it against the tube 3, is a metallic packing ring or compression sleeve or ferrule 10. The forward end of the said sleeve 10, i. e., the end facing the flaring mouth 4 of the body member 1, is conically tapered exteriorly to provide a primary forwardly facing wedge surface 11 substantially corresponding in angularity to, but preferably of slightly less angularity than the flaring mouth 4 of the body member. Thus, for example, where the flaring mouth 4 is inclined at an angle of approximately 20°, the conically tapered front end 11 of the sleeve 10 is inclined at a slightly smaller wedge angle of around 19° or so. At a slight distance of, for example, around 1/32 to 1/16 inch back from its tapered front end 11, the sleeve 10 is provided with an integral collar or enlargement 12 which is also conically tapered to form a forwardly facing secondary or rear wedge surface 13 adapted to engage the flaring mouth 4 of the body member 1 slightly subsequent to the engagement of the primary wedge surface 11 therewith during the tightening of the coupling. To this end, the rear or outer wedge surface 13 is located with its line W2 of wedging engagement with the flaring mouth 4 set back or offset rearwardly from that (W1) of the forward or inner wedge surface 11 a slight distance of the order of a few thousandths to a few hundredths of an inch. Like the forward or inner wedge surface 11, the rearward or outer wedge surface 13 is also inclined at a wedge angle more or less corresponding to that of the flaring mouth 4, for example, at an angle of around 17° to 18° in the case where the flaring mouth 4 and forward wedge surface 11 are inclined at angles of approximately 20° and 19°, respectively. For the purposes of the invention, the rear or outer wedge surface 13 is made of a diameter approximately corresponding to the diameter of the wider or outermost end portion of the flaring mouth 4 so as to engage the said portion of the flaring mouth when the coupling is tightened.

The sleeve collar 12 is formed with a rearwardly facing abutment surface or annular shoulder 14 which extends generally transverse to the axis of the sleeve 10 and to which the closing force of the outer nut 9 is applied when the coupling is tightened. The said abutment surface 14 preferably is inclined forwardly at an angle to the sleeve axis, which may be any angle less than 90°, as shown in Figs. 1–7. However, if desired, it may extend approximately normal to the axis of the sleeve 10, as shown at 15 in Fig. 8. The sleeve 10 is provided with a rear cylindrical extension or prolongation 16 which extends an appreciable distance outwardly beyond the cap nut 9 and which, because of its close fit with the tube 3, serves to reinforce or additionally support the tube, such reinforcement being of especial utility and advantage in cases where the coupling is subjected to severe vibration in use. If desired, the cap nut 9 may also be provided with a rear cylindrical extension or prolongation 17, as shown in dash-dot lines in Fig. 8, which closely surrounds the sleeve extension 16 to provide an additional reinforcement or support for the tube 3. At its forward or inner end, the sleeve 10 has its inside edge rounded off slightly, as indicated at 18 (Fig. 5), so as not to cut or bite into the material of the tube 3 when the coupling is tightened, thereby avoiding the development of a sharp circumferential line of contact with the tube with its attendant high localization of stresses such as would result in the early development of fatigue in the tube and eventual shearing or severance thereof at such localized stress region, particularly where the coupling is subjected to severe vibration in use.

The sealing sleeve or ferrule 10 may be made of substantially the same kind of metal as the tube 3 with which it is to be used. It is, however, preferably made of slightly harder material than the tube 3. For most cases, it is desirable to make the sleeve 10 of a metal which is electrolytically inert with respect to the metal of which the tube or pipe 3 is composed. Thus, for copper or brass tubing 3, the sleeve 10 may be of a suitable brass; for aluminum tubing, aluminum or duralumin; for wrought iron, cast iron and steel pipe and tubing, a suitable grade of steel, e. g., a mild steel, which is slightly harder than the material of the pipe or tube 3.

The female connector member or cap nut 9 is provided with an internal shoulder or abutment surface 19 for applying the closing force of the nut to the sleeve 10. This abutment surface may extend substantially parallel to the opposed abutment surface 14 or 15, as shown at 19 in Figs. 1–4 and at 20 in Fig. 8, or it may be inclined at a lesser angle than the abutment surface 14 on the sleeve 10 so that the two abutment surfaces 14, 19 in effect converge toward each other radially outward of the sleeve, as shown in Fig. 7. However, in the preferred form of the invention shown in Fig. 6, the abutment surface 19 is inclined at a comparatively steep angle of, for example, around 60° or so to the sleeve axis while the abutment surface 14 on the sleeve 10 is inclined at a lesser angle of, for example, around 30° or thereabouts so that the two abutment surfaces 14, 19 therefore diverge from each other radially outward of the sleeve. The nut 9 is provided with a bore 21 in its end wall 22 of a diameter slightly (0.010 inch or so) larger than the outside diameter of the sleeve extension 16 so as to freely slide thereover. The nut 9 is also formed with an enlarged bore portion 23 which is provided with screw threads 24 for screw threaded engagement with the external screw threads 8 on the male connector or body member 1.

The abutment surface 19 of the cap nut 9 may directly engage or abut the opposed abutment surface or shoulder 14 on the sleeve 10 to transmit the closing force of the nut thereto. Preferably, however, in accordance with the invention, the closing force of the nut 9 is transmitted to the sleeve 10 through an intermediate lock ring or lock washer member 25 which is interposed and compressed between the two opposed abutment surfaces 14 and 19. The said ring 25 may be made of any suitable material softer, harder, or of substantially the same hardness as the material of the sleeve 10 (preferably of harder material), and it may be formed of wire, such as music wire for instance, of either round cross-section as shown, or of square or rectangular section, and of a suitable wire diameter or thickness dimensions. For example, in the particular case illustrated in Figs. 1–4, the lock ring 25 is formed of hardened music wire having a wire diameter of around 0.05 inch or so. The lock ring 25 has an arcuate extent of somewhat less than a full circle, preferably around 315° or so, and it is preferably formed as a partial turn of a helix of slight pitch, as shown in Fig. 1. Also, in the preferred form of the invention, the ring 25 is of contractible character and is formed with an inside diameter approximately corresponding to the outside diameter of the rearward sleeve extension 16, within a few thousandths of an inch or thereabouts, so as to have a snug sliding fit thereover.

In assembling the coupling according to the invention, the tube 3 is inserted through the flaring mouth 4 of the body member 1 until the end 7 of the tube abuts against the shoulder 6 provided in the bore 2 of the body member. The packing ring or sleeve 10 is then moved along the tube 3 into the flaring mouth 4 and the nut 9 screwed onto the threads 8 of the body member 1. On tightening the nut 9, the metallic packing sleeve or ferrule 10 is forced against the flaring mouth 4 of the body member 1, the wedge surface 11 at the forward end of the sleeve initially engaging and wedging against the flaring mouth 4. The front end portion of the sleeve 10 is thereby contracted or deformed inwardly against the tube 3 to tightly grip and neck it, as shown at 26 in Figs. 3 and 4, so that any unevenness in the surface of the tube such as weld-seams and the like is effectively counteracted and a firm and fluid-tight seal produced between the tube and the contracted front end portion of the sleeve. At the same time, the forward wedge surface 11 of the sleeve 10 adapts itself to conform to the shape of the flaring mouth 4 and, in sliding along the latter while forcibly pressed thereagainst, effects a polishing of the surfaces in contact whereby they are made to fit tightly so as to also form a firm fluid-tight seal therebetween. Because of the slightly rounded character of the inside front edge 18 of the sleeve 10, and also because of the fact that the wedging pressure of the flaring mouth 4 is applied back along substantially the full length of the wedging surface 11 so that the front end portion of the sleeve at least coextensive with the wedging surface 11 is in effect bodily displaced inwardly or contracted against the tube, the engagement of and gripping pressure exerted by the contracted front end portion of the sleeve 10 on the tube 3, and consequently the necking of the latter, therefore takes place along an appreciable length of the tube inwardly of the sleeve from its front end, as shown in Figs. 3 and 4. As a result, the stresses applied to the tube 3 by the contracted front end portion of the sleeve 10 are effectively distributed along an appreciable length of the tube so that they do not cause fatigue in the material thereof and resultant early failure of the coupling, even under the severest of service conditions.

Upon continued tightening of the nut 9, the secondary or rearward wedge surface 13 formed on the collar 12 of the sleeve 10 comes into engagement with and wedges against the flaring mouth 4 which thus tends to contract the sleeve at such point. However, because of its greater wall thickness at the region of the collar 12, the sleeve is not as easily contracted at such region as at its forward end. As a result, the collar portion 12 of the sleeve offers a considerably greater resistance to the further inward movement of the sleeve 10 into the flaring mouth 4 so that the wedge surface 13 actually functions, in effect, as a limiting stop serving to prevent excessive additional inward movement of the sleeve into the flaring mouth such as would overly deform and stress the tube 3 beyond the allowable limits and cause the early failure thereof.

Upon further limited tightening of the coupling following the engagement of the wedge surface 13 with the flaring mouth 4, the closing force applied to the sleeve 10 by the lock ring 25 acts to deform the sleeve inwardly at the region of the ring 25, with accompanying backward bending or tilting of the collar 12, as a result of which the tube 3 is additionally contracted or necked at such region. The backward bending or tilting of the wedge collar 12 also changes the inclination of its rear abutment surface 14 to a steeper angular position out of parallelism with the opposing abutment surface 19 of the closure nut 9 so that the two surfaces 14, 19 then converge radially outward of the sleeve and as a result act as wedging means to exert an inward contracting force on the ring 25 which contracts it against the rearward extension 16 of the sleeve, causing it to be contracted in the manner as indicated at 27 in Fig. 4. This contraction of the sleeve at 27 in turn deforms the tube 3 inwardly so as to form a secondary contraction or neck-in 28 of the tube at the plane of the ring 25 which serves to provide an additional fluid-tight seal as well as a secondary interlock between the tube and the sleeve. The final net result therefore is the formation of a more or less uniformly necked tube section 29 of appreciable axial length which extends from the forward end of the sleeve 10 back to the lock ring 25 and which assures that the stresses applied by the sleeve to the tube 3 will be effectively distributed over a wide area of the latter, thus avoiding the development of fatigue in the metal of the tube with resultant early failure of the coupling, even under the severest of present day operating conditions.

In addition to its secondary necking and locking action on the tube 3, the ring 25 also functions in the manner of a lock washer to lock the nut 9 against unscrewing from the body member 1. The coupling is thereby maintained tight at all times, and prevented from loosening, even in cases where it is subjected to the most severe operating conditions.

Since the secondary wedge surface 13, during the tightening of the coupling, wedges against the outermost end portion of the flaring mouth 4 where the wall thickness of the body member 1 is comparatively thin, it therefore acts to expand or enlarge the outermost end portion of the body member to the minute degree required to force the outermost two or three threads of the body member into the mating screw threads of the nut 9 so as to completely take up the thread tolerance normally present between the interengaged screw threads and wedge them tightly together. A secondary lock against unscrewing of the coupling members 1 and 9, supplementing that provided by the lock ring 25, is thus produced by the tightly interwedged screw threads.

In the preferred form of the invention shown in Fig. 6, the opposed surfaces 14 and 19 on the sleeve 10 and nut 9 are formed so as to diverge from each other radially outward of the sleeve, the abutment surface 19 being inclined at a comparatively steep angle of, for example, around 60° or so to the sleeve axis while the abutment surface 14 is inclined at a lesser and preferably substantially acuter angle, for example, of the order of 30° or so to the sleeve axis. Also, in this form of the invention, the lock ring 25 is of a wire diameter such that it fits more or less closely between the exterior surface of the sleeve extension 16 and the interior wall 23 of the nut 9. The coupling construction of Fig. 6 affords a quicker and more readily obtained secondary necking of the tube 3 by the sleeve 10 at the region of the lock ring 25. During the tightening of the coupling, the lock ring 25 is forced by the nut 9 up the inclined ramp surface 14 (owing to its being free to expand) and is wedged between the said surface 14 and the inner wall 23 of the nut. Thereupon, the wedged ring 25 exerts a powerful radially inward force on the sleeve 10 acting to deform it inwardly at the region of the ring, resulting in turn in a secondary necking of the tube 3 at the said region.

In the modification shown in Fig. 7 the rearward extension 16 on the sleeve 10 is omitted and the contractible lock ring 25 directly engages the tube 3 instead, the ring 25 in this case being formed to an inside diameter such as to have a snug sliding fit over the tube. In addition, the opposed abutment surfaces 14 and 19 on the sleeve 10 and nut 9 are formed so as to initially converge toward each other radially outward of the sleeve. Upon tightening of the coupling, the ring 25 is compressed between the two opposing and convergent bearing surfaces 14 and 19 and, as before, is contracted by the said converging surfaces directly against the tube 3 to secondarily neck it in substantially the same manner effected by the ring 25 and sleeve extension 16 in Figs. 1–4, as shown at 29 in Fig. 4. It will be understood, of course, that the use of radially outward converging abutment surfaces 14, 19 is not limited to the particular form of the invention shown in Fig. 7 wherein the sleeve extension 16 is omitted and the lock ring 25 directly engages the tube 3, but that such outwardly converging abutment surfaces 14, 19 may be embodied as well in the form of the invention shown in Figs. 1–4 wherein the ring 25 engages an extension 16 of sleeve 10.

In the modification of Fig. 8, an expansible or snap type lock ring 30 is employed instead of the contractible lock ring 25 of Figs. 1–7. In this case the wedge collar 12 on the sleeve 10 is enlarged to a diameter almost equal to that of the inner wall 23 of the nut 9, and the snap ring 30 is expanded against the said wall 23 and compressed between the opposed bearing surfaces 15 and 20 on the sleeve 10 and nut 9, respectively. The snap ring 30 does not act to secondarily neck the tube 3 like the contractible lock ring 25 of Figs. 1–7, its only function in this case being to lock the nut 9 against unscrewing from the body member 1 during the use of the coupling.

The various component parts comprising the tube coupling according to the invention are of simple form and comparatively easy to make, the body member 1, nut 9 and sleeve 10 all being of a construction such that they can be made to the necessary accuracy by simple machine operations performed on automatic high-production machinery such as a screw machine, for instance. As a result, the coupling is relatively inexpensive and lends itself to high-speed production manufacture with little or no shrinkage or production rejects.

In performance, couplings according to the invention will satisfactorily withstand internal fluid pressures of up to in excess of 25,000 pounds per square inch on intermittent or pulsating pressure tests while remaining fluid-tight. Also, because of the distribution over an appreciable area of the pipe or tubing of the stresses applied thereto by the coupling, the development of fatigue points in the metal of the tube with resultant failure of the coupling is greatly minimized, even under the most severe of present day service conditions, as in supersonic aircraft installations for instance. In addition, the secondary neck-in of the pipe or tube 3 produced by the lock ring 25, together with the neck-in of the pipe or tube effected by the front wedge surface 11 of the sleeve 10, affords a double lock, in effect, against longitudinal pull-out of the pipe or tube from the coupling. The lock ring 25 or 30 also serves to effectively prevent unscrewing of the coupling members 1 and 9 and resultant loosening and failure of the coupling, even where the latter is subjected to exceedingly severe vibration effects such as are encountered in modern supersonic aircraft service, for example.

What I claim is:

1. A tube coupling comprising a body member provided with a tube-receiving bore having an outwardly flaring mouth, a sleeve closely surrounding the tube and having an externally tapered forward end engageable with said flaring mouth and an external collar spaced from the said forward end of the sleeve and provided with a forwardly facing tapered surface engageable with said flaring mouth and having its line of wedging engagement therewith set back from that of the forward end of the sleeve a slight distance of the order of a few thousandths to a few hundredths of an inch, said collar also having a rearwardly-facing forwardly-inclined abutment surface, a coupling nut member having a screw-threaded connection with said body member and provided with an internal abutment surface opposed to the abutment surface on said sleeve and extending from an annular inner wall portion of the nut member, and a contractible lock ring encircling the sleeve and interposed between said abutment surfaces to transmit the closing force of the coupling nut member to said sleeve, said lock ring being formed of approximately round section wire of a diameter approximating the radial space between the sleeve and the said inner wall portion of the coupling nut member so as to substantially bridge the said space, and the abutment surface on said sleeve extending outwardly therefrom in divergent relation to the abutment surface on said nut member and in convergent relation to the said inner wall portion of the nut member so as to cause the lock ring to be wedged between the said inner wall portion of the nut member and the abutment surface on the sleeve during tightening of the coupling to thereby exert a contractive force on said sleeve.

2. A tube coupling substantially as set forth in claim 1 wherein the said abutment surfaces on the sleeve and coupling nut member are inclined at angles of the order of 30° and 60° respectively with respect to the longitudinal axis of the coupling.

References Cited in the file of this patent
UNITED STATES PATENTS

| | | |
|---|---|---|
| 1,755,210 | Dohner | Apr. 22, 1930 |
| 2,152,975 | Sanford | Apr. 4, 1939 |
| 2,287,889 | Krumsiek | June 30, 1942 |
| 2,390,103 | Johnson | Dec. 4, 1945 |
| 2,463,707 | Matousek | Mar. 8, 1949 |
| 2,496,510 | Wolfram | Feb. 7, 1950 |
| 2,570,224 | Fason | Oct. 9, 1951 |
| 2,615,733 | Watson | Oct. 28, 1952 |
| 2,640,716 | Bigelow | June 2, 1953 |
| 2,657,077 | Woodling | Oct. 27, 1953 |